3,341,533
N-OXIDES OF PHENOTHIAZINE COMPOUNDS
Harry L. Yale, New Brunswick, N.J., assignor to E. R. Squibb & Sons, Inc., New York, N.Y., a corporation of Delaware
No Drawing. Filed Mar. 5, 1965, Ser. No. 437,561
6 Claims. (Cl. 260—243)

This invention relates to new chemical compounds and more particularly to new N-oxides of certain phenothiazine compounds.

The new compounds of this invention include bases of the Formula I:

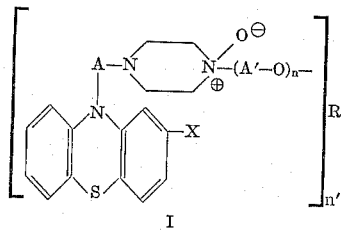

I and acid-addition salts thereof, wherein X is hydrogen, halogen (preferably chloro), lower alkyl, lower cycloalkyl (e.g., cyclopropyl and cyclobutyl), lower alkoxy, lower cycloalkoxy (e.g., cyclopropyl and cyclobutoxy), lower alkanoyl, lower alkyl mercapto, trifluoromethylmercapto, lower alkylsulfonyl, N,N'-di-lower alkylsulfonamido, cyano and optimally trifluoromethyl; A and A' are each lower alkylene, preferably of two to three carbon toms; $n$ and $n'$ is one or two; and R is hydrogen or an acyl radical of a hydrocarbon carboxylic acid or dicarboxylic acid. The preferred hydrocarbon carboxylic acids include the alkanoic acids (e.g., acetic, propionic, enanthic, decanoic and lauric acid), the alkenoic acids (e.g., undecyclenic, oleic and 2-heptenoic acid), the alkynoic acids, the alkanedienoic acids (e.g., heptadienoic acid), aryl carboxylic acids (e.g., benzoic acid), cycloalkane carboxylic acids, aryl alkanoic acids (e.g., phenacetic and β-phenyl propionic acid), cycloalkene carboxylic acids and the alkanedioic acids (e.g., succinic, glutaric, adipic and azelaic acid).

Among the acids useful in preparing the acid-addition salts may be mentioned the non-toxic pharmaceutically-acceptable inorganic and organic acids, such as the hydrohalic acids (e.g., hydrochloric and hydrobromic acid), sulfuric acid, nitric acid, phosphoric acid, oxalic acid, tartaric acid, citric acid, pamoic acid, fumaric acid, acetic acid, maleic acid and succinic acid.

The new compounds of this invention are physiologically active substances that possess tranquilizing activity and hence may be administered perorally or parenterally in the same manner as and in lieu of known tranquilizing agents. Unlike the N-oxides of other tranquilizing agents, such as the N-oxide of 10-(3-dimethylaminopropyl)-2-trifluoromethylphenothiazine, which has only about one-fourth the tranquilizing activity of 10-(3-dimethylaminopropyl) - 2 - trifluoromethylphenothiazine, it has been surprisingly found that the N-oxides of this invention retain the full potency of the parent compounds from which they are formed.

To prepare the compounds of this invention, compounds of the Formula II:

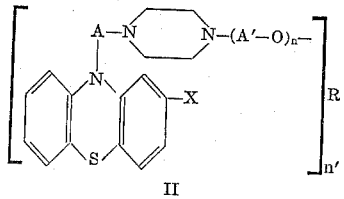

II wherein X, A, A', $n$, $n'$ and R are as hereinbefore defined, in the form of its free base, are interacted with hydrogen peroxide to yield the final products of this invention in the form of their free bases. If an acid-addition salt is desired, the free bases are then reacted with the desired acid in the usual manner.

Among the suitable starting compound of Formula II may be mentioned:

10-[N⁴-(2-hydroxyethyl)piperazinoethyl]-phenothiazine,
10-[3-[N⁴-(2-hydroxyethyl)piperazino]propyl]phenothiazine,
10-[N⁴-[3-(3-hydroxypropyl)piperazino]propyl] phenothiazine,
10-[3-[N⁴-(2-hydroxyethyl)piperazino]propyl]-2-chlorophenothiazine,
10-[3-[N⁴-(2-hydroxyethyl)piperazino]propyl]-2-methylphenothiazine,
10-[3-[N⁴-(2-hydroxyethyl)piperazino]propyl]-2-cyclopropylphenothiazine,
10-[3-[N⁴-(2-hydroxyethyl)piperazino]propyl]-2-methoxyphenothiazine,
10-[3-[N⁴-(2-hydroxyethyl)piperazino]propyl]-2-acetylphenothiazine,
10-[3-[N⁴-(2-hydroxyethyl)piperazino]propyl]-2-cyanophenothiazine,
10-[3-[N⁴-(2-hydroxyethyl)piperazino]propyl]-2-methylmercaptophenothiazine,
10-[3-[N⁴-(2-hydroxyethyl piperazino]propyl]-2-(N,N'-dimethylamino sulfonyl)phenothiazine,
10-[3-[N⁴-(2-hydroxyethyl)piperazino]propyl-2-trifluoromethylmercaptophenothiazine,
10-[3-[N⁴-(2-hydroxyethyl)piperazino]propyl-2-methylsulfonylphenothiazine,
10-[3-[N⁴-(2-hydroxyethyl)piperazino]propyl-2-trifluoromethylphenothiazine,
10-[3-[N⁴-(2-acetoxyethyl)piperazino]propyl]-2-trifluoromethylphenothiazine,
10-[3-[N⁴-[2-(2-hydroxyethoxy)ethyl]piperazino] propyl]-2-trifluoromethylphenothiazine,
10-[3-[N⁴-[2-(2-acetoxyethoxy)ethyl]piperazino] propyl]-2-trifluoromethylphenothiazine,
10-[3-[N⁴-(2-heptanoyloxyethyl)piperazino]propyl]-2-trifluoromethylphenothiazine,
10-[3-[N⁴-(2-decanoyloxyethyl)piperazino]propyl]-2-trifluoromethylphenothiazine,
10-[3-[N⁴-(2-undecenoyloxyethyl)piperazino]propyl] 2-trifluoromethylphenothiazine,
azelaoylbis[10-[3-[4-(2-hydroxyethyl)piperazino] propyl]-2-thrifluoromethylphenothiazine],
10-[2-[N⁴-(3-hydroxypropyl)piperazino]ethyl]-2-trifluoromethylphenothiazine, and
10-[3-[N⁴-(2-benzoyloxyethyl)piperazino]propyl]-2-trifluoromethylphenothiazine.

The following examples illustrate the invention (all temperatures being in centigrade):

EXAMPLE 1

*10-[3-[N⁴-(2-hydroxyethyl)piperazino]propyl]-2-trifluoromethylphenothiazine N⁴-oxide hydrochloride*

A mixture of 20.2 g. of 10-[3-[N⁴-(2-hydroxyethyl) piperazino]propyl]-2-trifluoromethylphenothiazine, 5.6 g. of 30% hydrogen peroxide, and 150 ml. of ethanol are heated under reflux for 3.5 hours and then cooled. To the cooled solution is added 0.2 g. 5% palladium on carbon and the mixture is heated under reflux for 0.25 hour, filtered, the filtrate is diluted with 100 ml. of water, and the whole concentrated to about 50 ml. This is treated with 150 ml. of water, extracted with two 150 ml. portions of ether, and the water layer is separated and concentrated to dryness in vacuo. The residue is dissolved in 100 ml. each of absolute ethanol and dry benzene and the solution again concentrated to dryness in vacuo to give 23 g. of crude base. This is dissolved in 100 ml. of acetonitrile, the solution is cooled in ice water and 4 N etheral hydrogen chloride added until the mixture is acid to Congo Red indicator. The solid which separates is filtered, dried throughly and recrystallized from ethanol to give the product, M.P. about 250–207° (dec.).

EXAMPLE 2

*10-[3-[N⁴-(2-hydroxyethyl)piperazino]propyl]-2-chloro-phenothiazine N⁴-oxide hydrochloride*

By substituting 18.5 g. of 10-[3-[N⁴-(2-hydroxyethyl)piperazino]propyl]-2-chlorophenothiazine for the 20.2 g. of 10 - [3 - [N⁴-(2-hydroxyethyl)piperazino]propyl]-2-trifluoromethylphenothiazine in Example 1 and carrying out the procedure therein described, there is obtained the above named product.

EXAMPLE 3

*10-[3-[N⁴-(2-hydroxyethyl)piperazino]propyl]-2-methoxyphenothiazine N⁴-oxide hydrochloride*

By substituting 18.3 g. of 10-[3-[N⁴-(2-hydroxyethyl)piperazino]propyl]-2-methoxyphenothiazine for the 20.2 g. of 10 - [3-[N⁴-(2-hydroxyethyl)piperazino]propyl]-2-trifluoromethylphenothiazine in Example 1 and performing the procedure therein described, there is obtained the above named product.

EXAMPLE 4

*10-[3-[N⁴-(2-heptanoyloxyethyl)piperazino]propyl]-2-trifluoromethylphenothiazine N⁴-oxide hydrochloride*

By substituting 25.8 g. of 10-[3-[N⁴-(2-heptanoyloxyethyl)piperazino]propyl] - 2 - trifluoromethylphenothiazine for the 20.2 g. of 10-[3-[N⁴-(2-hydroxyethyl)piperazino]propyl]-2-trifluoromethylphenothiazine in Example 1, and proceeding as described therein, there is obtained the above named product.

EXAMPLE 5

*10[3-[N⁴-(2-decanoyloxyethyl)piperazino]propyl]-2-trifluoromethylphenothiazine N⁴-oxide hydrochloride*

By substituting 27.9 g. of 10-[3-[N⁴-(2-decanoyloxyethyl)piperazino]propyl] - 2 - trifluoromethylphenothiazine for the 20.2 g. of 10-[3-[N⁴-(2-hydroxyethyl)piperazino]propyl] - 2 - trifluoromethylphenothiazine in Example 1 and proceding as described therein, there is obtained the above named product.

The invention may be variously otherwise embodied within the scope of the appended claims.

What is claimed is:
1. A compound selected from the group consisting of a base of the formula

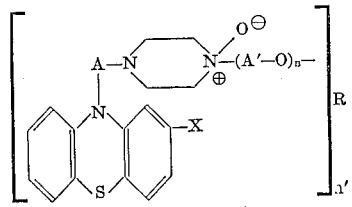

and a non-toxic pharmaceutically acceptable acid-addition salt thereof, wherein X is selected from the group consisting of hydrogen, halogen, lower alkyl, lower cycloalkyl, lower alkoxy, lower cycloalkoxy, lower alkanoyl, lower alkylmercapto, trifluoromethylmercapto, lower alkylsulfonyl, di-lower alkylsulfonamido, cyano and trifluoromethyl; A and A' are each lower alkylene; n and n' are integers selected from the group consisting of one and two; and R is selected from the group consisting of hydrogen, and, when n' is 1, the acyl radical of an acid selected from the group consisting of alkanoic acid having two to twelve carbon atoms, alkenoic acid having three to eighteen carbon atoms, alkanedienoic acid having seven carbon atoms, benzoic acid, and phenyl (lower alkanoic) acid, and when n' is 2, the acyl radical of an alkanedioic acid having four to nine carbon atoms.

2. 10 - [3-[N⁴-(2-hydroxyethyl)piperazino]propyl]-2-trifluoromethylphenothiazine N⁴-oxide.

3. A non-toxic pharmaceutically acceptable acid addition salt of the compound of claim 2.

4. The hydrochloride salt of the compound of claim 2.

5. 10 - [3 - [N⁴ - (2 - heptanoyloxyethyl)piperazino] propyl]-2-trifluoromethylphenothiazine N⁴-oxide.

6. 10 - [3 - [N⁴ - (2 - decanoyloxyethyl)piperazino] propyl]-2-trifluoromethylphenothiazine N⁴-oxide.

References Cited

UNITED STATES PATENTS 2,921,069   1/1960   Ullyot _____ 260—243

OTHER REFERENCES

Moffett et al.: J. Am. Chem. Soc., vol. 82, p. 1600–07 (1960).

Berkman et al.: Catalysis, pages 454 and 705–6 (1940) Reinhold Pub. Corp. (New York).

WALTER A. MODANCE, *Primary Examiner.*

HARRY I. MOATZ, *Assistant Examiner.*